United States Patent [19]

Roueche

[11] 4,206,114
[45] Jun. 3, 1980

[54] MONOAZO PIGMENTS FROM DIAZOTIZED 5-ACYLAMINOANTHRANILIC ACID DERIVATIVES AND ACETOACETYLAMINOBENZIMIDAZO- LONES

[75] Inventor: Armand Roueche, Bottmingen, Switzerland

[73] Assignee: Ciba-Geigy Corporation, Ardsley, N.Y.

[21] Appl. No.: 925,341

[22] Filed: Jul. 17, 1978

[30] Foreign Application Priority Data

Jul. 27, 1977 [CH] Switzerland .......................... 9286/77

[51] Int. Cl.² ........................................... C09B 29/36
[52] U.S. Cl. ................................. 260/157; 106/288 Q
[58] Field of Search ......................................... 260/157

[56] References Cited
U.S. PATENT DOCUMENTS 4,080,321  3/1978  Kunstmann et al. ................ 260/157

FOREIGN PATENT DOCUMENTS 1808017   6/1970  Fed. Rep. of Germany ........... 260/157
2130040  12/1972  Fed. Rep. of Germany ........... 260/157

Primary Examiner—Arthur P. Demers
Attorney, Agent, or Firm—Joseph F. DiPrima

[57] ABSTRACT

Monoazo pigments of the formula

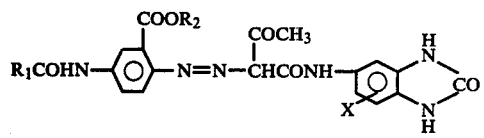

wherein
R₁ and R₂ represent hydrogen, methyl or ethyl, and
X represents hydrogen, chlorine, methyl, methoxy or ethoxy, are useful for coloring plastics in fast yellow shades.

7 Claims, No Drawings

MONOAZO PIGMENTS FROM DIAZOTIZED 5-ACYLAMINOANTHRANILIC ACID DERIVATIVES AND ACETOACETYLAMINOBENZIMIDAZOLONES

The present invention relates to valuable novel monoazo pigments of the formula

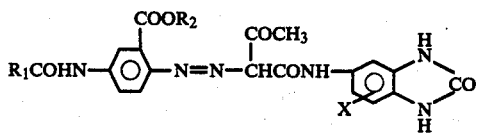

wherein
$R_1$ and $R_2$ represents hydrogen, methyl or ethyl, and
X represents hydrogen, chlorine, methyl, ethyl, methoxy or ethoxy.

Pigments of particular interest are those of the formula

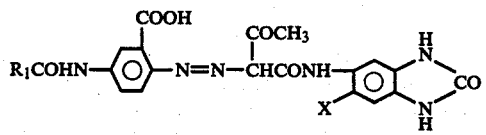

wherein
$R_1$ represents methyl or ethyl, and
X represents hydrogen, chlorine, methyl or methoxy.

The novel pigments are obtained by coupling a diazo compound of an amine of the formula

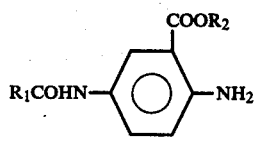

with an acetoacetic acid arylide of the formula

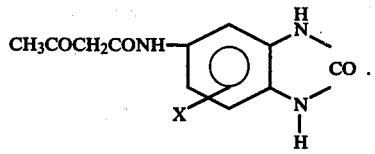

Preferred diazo components are those of the formula

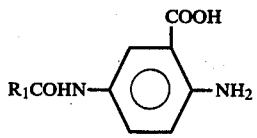

wherein $R_1$ represents methyl or ethyl.

The following diazo components may be mentioned as examples:
5-acetylaminoanthranilic acid,
5-propionylaminoanthranilic acid, and
5-acetylaminoanthranilic acid methyl ester.

The coupling components used are preferably coupling components of the formula

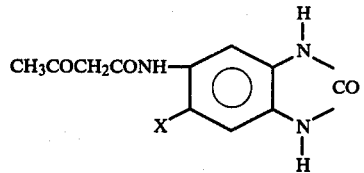

wherein X represents hydrogen, chlorine, methyl or methoxy.

The coupling components are obtained in a simple manner by reacting diketenes with the corresponding amines, for example:
5-aminobenzimidazolone,
5-amino-6-chlorobenzimidazolone,
5-amino-6-methylbenzimidazolone,
5-amino-6-methoxybenzimidazolone and
5-amino-7-chlorobenzimidazolone.

The coupling is effected usually by addition of the acid solution of the diazonium salt to the aqueous/alkali solution or aqueous/acetic acid solution or also aqueous/acetic acid suspension of the coupling component, or to the solution thereof in an organic solvent miscible with water, preferably at a pH value of 4 to 7.

The pH value is advantageously adjusted by adding a buffer. Suitable buffers are for example the salts, especially alkali salts, of formic acid, phosphoric acid or in particular acetic acid. The alkaline solution of the coupling component contains with advantage a wetting, dispersing of emulsifying agent, for example an aralkylsulphonate, such as dodecylbenzenesulphonate, or the sodium salt of 1,1'-dinaphthylmethanesulphonic acid, polycondensation products of alkylene oxides, such as the reaction product of ethylene oxide with p-tertoctylphenol, also alkyl esters of sulphoricinoleates, for example n-butylsulphoricinoleate. The dispersion of the coupling component can also advantageously contain protective colloids, for example methyl cellulose, or smallish amounts of inert organic solvents insoluble or difficulty soluble in water, for example optionally halogenated or nitrated aromatic hydrocarbons, such as benzene, toluene, xylene, chlorobenzene, dichlorobenzenes or nitrobenzene, and also aliphatic halogenated hydrocarbons such as carbon tetrachloride or trichloroethylene, also water-miscible organic solvents, such as acetone, methyl ethyl ketone, methanol, ethanol or isopropanol, particularly dimethylformamide.

The coupling reaction can also be advantageously performed by continuously combining, in a mixing nozzle, an acid solution of the diazonium salt with an alkaline solution of the coupling component, with an immediate coupling of the components occurring. The dye dispersion which is formed is continuously taken from the mixing nozzle, and the dye is separated by filtration.

Finally, the coupling can be performed also by suspending the amine with the coupling component, in the molar ratio of 1:1, in an organic solvent, and treating the suspension with a diazotising agent, particularly with an ester of nitrous acid, such as methyl nitrite, ethyl nitrite, butyl nitrite, amyl nitrite or octyl nitrite.

By virtue of their insolubility, the pigments obtained can be isolated from the reaction mixtures by filtration. Since the by-products remain in solution, the resulting pigments are obtained with an excellent degree of purity.

The resulting pigments have in general a good texture and can in many cases be used as crude products. If necessary or desired, however, the crude products can be converted by grinding or kneading into a finely divided form. It is for this purpose expedient to use grinding auxiliaries, such as inorganic and/or organic salts, in the presence or absence of organic solvents. After grinding, auxiliaries are removed in the customary manner: soluble inorganic salts for example with water, and water-insoluble auxiliaries for example by steam distillation. It is possible also by treatment of the crude pigments with organic solvents, preferably with organic solvents which boil above 100° C., to frequently obtain an improvement in their properties. Organic solvents which have proved particularly suitable are benzenes substituted by halogen atoms or by alkyl or nitro groups, such as xylenes, chlorobenzene, o-dichlorobenzene or nitrobenzene, and also pyridine bases such as pyridine, picoline or quinoline, also ketones such as cyclohexanone, ethers such as ethylene glycol monomethyl ether or ethylene glycol monoethyl ether, amides such as dimethylformamide or N-methyl-pyrrolidone, as well as dimethylsulphoxide, sulpholane or water alone; the solvent treatment is optionally performed under pressure. The aftertreatment can also be carried out in water alone or in admixture with organic solvents and/or with the addition of surface-active substances.

The aftertreatment is performed preferably by heating the pigment in the solvent at 100° to 150° C., in the process of which there occurs in many cases a coarsening of the particles, which has a favourable effect on the fastness of the resulting pigments to light and to migration.

The novel compounds are pigments which, in finely divided form, can be used for pigmenting high-molecular organic material, for example cellulose ethers and cellulose esters, polyamides and polyurethanes or polyesters, cellulose acetate, nitrocellulose, natural resins or synthetic resins, such as polymerisation resins or condensation resins, for example aminoplasts, especially urea-formaldehyde resins and melamineformaldehyde resins, alkyd resins, phenoplasts, polycarbonates, polyolefins, such as polyethylene and polypropylene, polystyrene, polyvinyl chloride, polyacrylonitrile, polyacrylates, rubber, casein, silicones and silicone resins, singly or in mixtures.

It is in this respect not important whether the said high-molecular compounds are in the form of plastic mixtures or in the form of melts, or in the form of spinning solutions or printing pastes. Depending on the purpose of application, it proves advantageous to use the novel pigments as toners or in the form of preparations.

The novel pigments are characterised by good general fastness properties, in particular by good fastness to light, weather and overvarnishing, and also by good resistance to heat, good covering capacity, dispersibility, colouring strength and brilliancy.

Compared with the properties of pigments containing only one COOH- group or one NHCOCH₃ group, the pigment properties are improved by the combination of both groups in the pigment molecule, especially with regard to resistance to migration or to heat.

Except where otherwise stated in the Examples which follow, the term 'parts' denotes parts by weight, percentages are give as percent by weight and the temperatures in degrees Centigrade.

EXAMPLE 1

19.4 parts of 5-acetylaminoanthranilic acid are stirred up in 300 parts by volume of water at room temperature, and after about 10 minutes 30 parts by volume of 30% hydrochloric acid are added. The resulting suspension (chlorohydrate) is cooled with ice to 0°; to the suspension are added at 0°–5°, in the course of 5 minutes, 25 parts by volume of 4 N sodium nitrite, and the mixture is diluted with 100 parts of ice-water. After 15 minutes' subsequent stirring, any excess nitrite present is completely decomposed with sulphamic acid, and the reaction mixture is filtered until the filtrate is clear. 23.3 parts of 5-acetoacetylamino-benzimidazolone-2 are dissolved in 400 parts by volume of water and 25 ml of 30% sodium hydroxide solution at 30°; 50 parts of sodium acetate (crystallised) are added, and subsequently the diazo solution is quickly introduced in a thin stream. The pH value is between 5–6. The reaction mixture is then stirred at 20°–25° for a further 5 hours; it is afterwards heated to 80°, and the product is filtered off, and washed with 500 parts of water. The filter residue is dried at 90°–100° in vacuo to yield 42 parts (96% of theory) of a yellow pigment of the formula

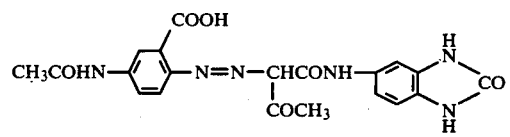

By subsequent treatment in 500 parts by volume of dimethylformamide (1 hour at 140°–145°), there are obtained 40.5 parts of the yellow pigment which has in polyvinyl chloride very good fastness to light and to migration, and in stoving lacquer very good resistance to weather.

The pigment is obtained in an equally good quality also by a subsequent treatment in 500 parts by volume of water (5 hours at 150° under pressure).

In the Table which follows are described further pigments which are obtained by coupling of the diazo compound of the amine listed in column I with the acetoacetyl compound of the amine of column II, and subsequent treatment with the solvents given in column III. In column IV is shown the shade of colour of the PVC sheet dyed with 0.2% of this pigment.

| No. | I. Diazo component | II. Acetoacetyl compound of | III. Solvent | IV. Shade |
|---|---|---|---|---|
| 2 | 5-acetylaminoanthranilic acid | 5-amino-6-chloro-benzimidazolone | dimethyl-formamide | yellow |
| 3 | 5-acetylaminoanthranilic acid | 5-amino-6-methyl-benzimidazolone | dimethyl-formamide | yellow |
| 4 | 5-acetylaminoanthranilic acid | 5-amino-6-methoxy-benzimidazolone | o-dichloro-benzene | reddish-yellow |
| 5 | 5-propionylaminoanthranilic acid | 5-aminobenz-imidazolone | dimethyl-formamide | greenish-yellow |

-continued

| No. | I. Diazo component | II. Acetoacetyl compound of | III. Solvent | IV. Shade |
|---|---|---|---|---|
| 6 | 5-propionylaminoanthranilic acid | 5-amino-6-chloro-benzimidazolone | dimethyl-formamide | yellow |
| 7 | 5-propionylaminoanthranilic acid | 5-amino-6-methyl-benzimidazolone | o-dichloro-benzene | reddish-yellow |
| 8 | 5-acetylaminoanthranilic acid methyl ester | 5-aminobenz-imidazolone | dimethyl-formamide | yellow |
| 9 | 5-acetylaminoanthranilic acid methyl ester | 5-amino-6-chloro-benzimidazolone | dimethyl formamide | yellow |
| 10 | 5-acetylaminoanthranilic acid | 5-amino-7-chloro-benzimidazolone | dimethyl formamide | yellow |

EXAMPLE 11

65 parts of stabilised polyvinyl chloride, 35 parts of dioctyl phthalate and 0.2 part of the pigment obtained according to Example 1 are mixed up together, and the mixture is then rolled backwards and forwards for 7 minutes at 140° on a two-roller calender. A yellow-dyed sheet having very good fastness to light and to migration is obtained.

EXAMPLE 12

1.00 g of the pigment produced according to Example 1 is finely ground, on an Engelsmann grinding machine, with 4.00 g of the lithographic varnish of the following composition 29.4% of linseed oil-stand oil (300 poise),
67.2% of linseed oil-stand oil (20 poise),
2.1T of cobalt octoate (8% Co) and
1.3% of lead octoate (24% Pb), and subsequently printed, with the aid of a block in the letterpress printing process, with 1 g/m² onto art paper. An intense pure yellow shade having good transparency and a good lustre is obtained. Very brilliant green shades can be produced in the three- or four-colour printing process by layer printing on blue.

The pigment is suitable also for other printing processes, such as gravure printing, offset printing and flexographic printing, and likewise gives very good results.

EXAMPLE 13

15 g of a collodion wool containing 35% of butanol, 15 g of a phthalate resin modified with castor oil, 15 g of a 70% butanolic solution of a urea lacquer resin, 20 g of butyl acetate, 10 g of glycol monoethyl ether, 20 g of toluene and 5 g of alcohol are processed into a lacquer. This is subsequently pigmented with 2 g of the dye according to Example 1 and 2 g of titanium oxide (Rutil) and then ground. The lacquer is sprayed onto cardboard and dried to leave a yellow coating which has very good fastness to light, to overvarnishing and to weather.

EXAMPLE 14

1 g of the dye according to Example 1 and 5 g of titanium dioxide are added to 100 g of a stoving lacquer consisting of 58.5 g of a 60% solution of a coconut alkyd resin in xylene, 23 g of a 65% solution of a melamine lacquer resin in butanol, 17 g of xylene and 1.5 g of butanol. The mixture is ground for 48 hours in a ball mill, and the lacquer pigmented in this manner is sprayed onto a cleansed metal surface. The result after stoving at 120° is a yellow dyeing having good fastness to light, to overvarnishing and to weather.

I claim:
1. A monoazo pigment of the formula

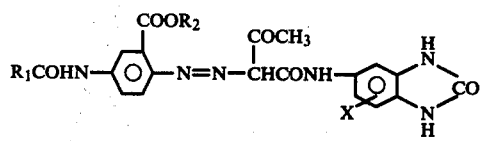

wherein
$R_1$ and $R_2$ represent hydrogen, methyl or ethyl, and
X represents hydrogen, chlorine, methyl, methoxy or ethoxy.

2. A monoazo pigment according to claim 1 of the formula

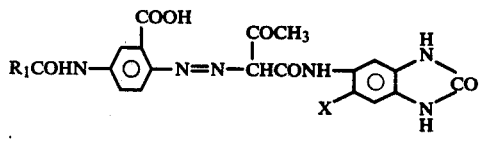

wherein
$R_1$ represents methyl or ethyl, and
X represents hydrogen, chlorine, methyl or methoxy.

3. A monoazo pigment according to claim 1 of the formula

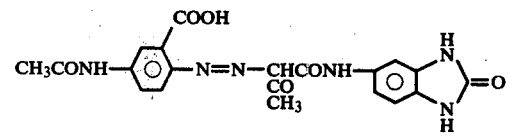

4. A monoazo pigment according to claim 1 of the formula

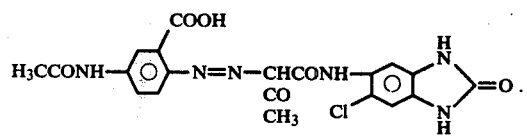

5. A monoazo pigment according to claim 1 of the formula

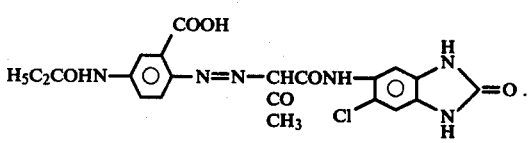

6. A monoazo pigment according to claim 1 of the formula
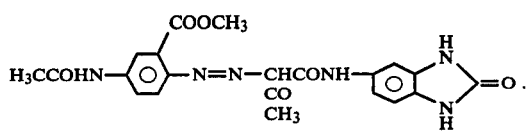
7. A monoazo pigment according to claim 1 of the formula
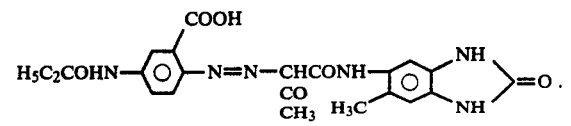
* * * * *